US011409996B2

(12) United States Patent
Allen et al.

(10) Patent No.: US 11,409,996 B2
(45) Date of Patent: Aug. 9, 2022

(54) CLUSTERING SUBJECT MATTER EXPERTS BASED ON QUESTION AND ANSWER RATINGS

(71) Applicant: International Business Machines Corporation, Armonk, NY (US)

(72) Inventors: Corville O. Allen, Morrisville, NC (US); Andrew R. Freed, Cary, NC (US); Joseph Kozhaya, Morrisville, NC (US); Dwi Sianto Mansjur, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 983 days.

(21) Appl. No.: 15/825,774

(22) Filed: Nov. 29, 2017

(65) Prior Publication Data

US 2019/0164016 A1 May 30, 2019

(51) Int. Cl.

| | |
|---|---|
| ***G06N 20/00*** | (2019.01) |
| ***G06F 16/00*** | (2019.01) |
| ***G06K 9/62*** | (2022.01) |
| ***G06F 16/332*** | (2019.01) |
| ***G06F 16/35*** | (2019.01) |

(52) U.S. Cl.

CPC ....... *G06K 9/6263* (2013.01); *G06F 16/3329* (2019.01); *G06F 16/355* (2019.01); *G06K 9/6222* (2013.01); *G06N 20/00* (2019.01)

(58) Field of Classification Search

CPC . G06F 16/3329; G06F 16/355; G06K 9/6222; G06K 9/6263; G06N 20/00

See application file for complete search history.

(56) References Cited

U.S. PATENT DOCUMENTS

| | | | | |
|---|---|---|---|---|
| 8,868,516 | B2 | 10/2014 | Laredo et al. | |
| 9,257,052 | B2 | 2/2016 | Rapp et al. | |
| 9,582,757 | B1 * | 2/2017 | Holmes | G06N 3/006 |

(Continued)

OTHER PUBLICATIONS

Marti A. Hearst, The debate on automated essay grading, Oct. 2000, IEEE Intelligent Systems (Year: 2000).*

(Continued)

*Primary Examiner* — Benjamin P Geib
*Assistant Examiner* — Qamar Iqbal
(74) *Attorney, Agent, or Firm* — Aaron N. Pontikos; William H. Hartwell

(57) ABSTRACT

Software that performs the following operations: (i) receiving descriptive information associated with a domain expert; (ii) receiving a question and a corresponding candidate answer for the question; (iii) determining a set of scoring features to be used to evaluate the candidate answer, wherein the set of scoring features includes: at least one scoring feature pertaining to the question, at least one scoring feature pertaining to the candidate answer, and at least one scoring feature pertaining to the descriptive information; (iv) receiving a score from the domain expert, wherein the score is based, at least in part, on the domain expert's evaluation of the candidate answer; (v) generating a feature vector based on the set of scoring features; (vi) cross-correlating the feature vector with the score; and (vii) clustering the domain expert with one or more other domain experts according to the cross-correlation, thereby creating a first cluster.

20 Claims, 7 Drawing Sheets

(56) References Cited

U.S. PATENT DOCUMENTS

| | | | |
|---|---|---|---|
| 2014/0297571 | A1 | 10/2014 | Beamon et al. |
| 2014/0298199 | A1 | 10/2014 | Johnson, Jr. et al. |
| 2015/0178623 | A1 | 6/2015 | Balani et al. |
| 2016/0196265 | A1 | 7/2016 | Allen et al. |
| 2016/0196490 | A1 | 7/2016 | Chandrasekaran et al. |
| 2016/0232221 | A1* | 8/2016 | McCloskey ........... G06F 16/285 |

OTHER PUBLICATIONS

Barbosa, de Souza, Oliveira. Empowering the Delphi Decision-Making Process Using Expert Search from Social Networks. 2014. IEEE International Conference on Systems, Man, and Cybernetics (Year: 2014).*

D. C. Gondek, A. Lally, A. Kalyanpur, J. W. Murdock, P. A. Duboue, L. Zhang, Y. Pan, Z. M. Qiu, C. Welty. A framework for merging and ranking of answers in DeepQA. 2012. IBM J. Res. & DEV. (Year: 2012).*

Duen-Ren Liu ↑ , Yu-Hsuan Chen, Wei-Chen Kao, Hsiu-Wen Wang. Integrating expert profile, reputation and link analysis for expert finding in question-answering websites. 2013. Information Processing and Management. (Year: 2013).*

Urvesh Bhowan and D.J. McCloskey. Genetic Programming for Feature Selection and Question-Answer Ranking in IBM Watson. 2015 (Year: 2015).*

Adomavicius, Gediminas and Tuzhilin, Alexander, "Context-Aware Recommender Systems", Chapter 7, Recommender Systems Handbook, pp. 217-253, First Online: Oct. 5, 2010, DOI 10.1007/978-0-387-85820-3.

Du, Jun and Ling, Charles X., "Asking Generalized Queries to Domain Experts to Improve Learning", IEEE Transactions on Knowledge and Data Engineering, vol. 22, No. 6, Jun. 2010, pp. 812-825, Manuscript received Apr. 2, 2009, revised Sep. 28, 2009, accepted Nov. 9, 2009, published online Feb. 4, 2010, Digital Object Identifier No. 10.1109/TKDE.2010.33, © 2010 IEEE.

Tom, "What is inter-annotator agreement?", Corpus Linguistic Methods, A practical introduction with R and Python, 2 pages, posted on Jan. 15, 2014 Feb. 14, 2014, <https://corpuslinguisticmethods.wordpress.com/2014/01/15/what-is-inter-annotator-agreement/>.

"Cohen's kappa", From Wikipedia, the free encyclopedia, retrieved and printed on Aug. 23, 2017, 9 pages, This page was last edited on Aug. 10, 2017, <https://en.wikipedia.org/wiki/Cohen's_kappa>.

"Collaborative filtering", From Wikipedia, the free encyclopedia, retrieved and printed on Aug. 23, 2017, 10 pages, This page was last edited on May 16, 2017, <https://en.wikipedia.org/wiki/Collaborative_filtering>.

"Fleiss' kappa", From Wikipedia, the free encyclopedia, retrieved and printed on Aug. 23, 2017, 5 pages, This page was last edited on Jun. 26, 2017, <https://en.wikipedia.org/wiki/Fleiss'_kappa>.

"Inter-rater reliability", From Wikipedia, the free encyclopedia, retrieved and printed on Aug. 23, 2017, 5 pages, This page was last edited on Jun. 16, 2017, <https://en.wikipedia.org/wiki/Inter-rater_reliability.

Allen et al., "System and Method for Ground Truth Evaluation", U.S. Appl. No. 15/234,676, filed Aug. 11, 2016, 46 pages.

Allen et al., "System and Method for Ground Truth Evaluation", U.S. Appl. No. 15/234,767, filed Aug. 11, 2016, 45 pages.

Drozda et al., "Online Crowdsource System Supporting Ground Truth Datasets Creation", Artificial Intelligence and Soft Computing, 12th International Conference, ICAISC 2013, Proceedings Part I, LNAI 7894, pp. 532-539, 2013, © Springer-Verlag Berlin Heidelberg 2013.

"Automatic, In-Domain, Question/Answer-Set Generation", An IP.com Prior Art Database Technical Disclosure, Authors et. al.: Disclosed Anonymously, IP.com No. IPCOM000245124D, IP.com Electronic Publication Date: Feb. 10, 2016, 5 pages, http://ip .com/IPCOM/000245124D.

"Improving User Feedback in a Question Answering System for Indirect Answers", An IP.com Prior Art Database Technical Disclosure, Authors et. al.: Disclosed Anonymously, IP.com No. IPCOM000239021D, IP.com Electronic Publication Date: Oct. 1, 2014, 4 pages, http://ip.com/IPCOM/000239021D.

"System and method for generating question type distribution of a training data set in a Question/Answering System", An IP.com Prior Art Database Technical Disclosure, Authors et. al.: Disclosed Anonymously, IP.com No. IPCOM000239801D, IP.com Electronic Publication Date: Dec. 2, 2014, 5 pages, http://ip .com/IPCOM/000239801D.

* cited by examiner

| Question | Answer | Score |
|---|---|---|
| What is IBM? | IBM is a corporation. | 3 |
| What is IBM? | IBM is a technology company headquartered in Armonk, NY, USA. | 9 |
| Where is IBM located? | IBM is headquartered in Armonk, NY, USA. | 8 |

Feedback: Thank you for providing candidate answer scores. Our results show that SMEs with similar amounts of experience to you (less than ten years) tend to provide higher scores when candidate answers are longer than five words. Conversely, SMEs with more than ten years of experience tend to provide higher scores when candidate answers are shorter than 6 words.

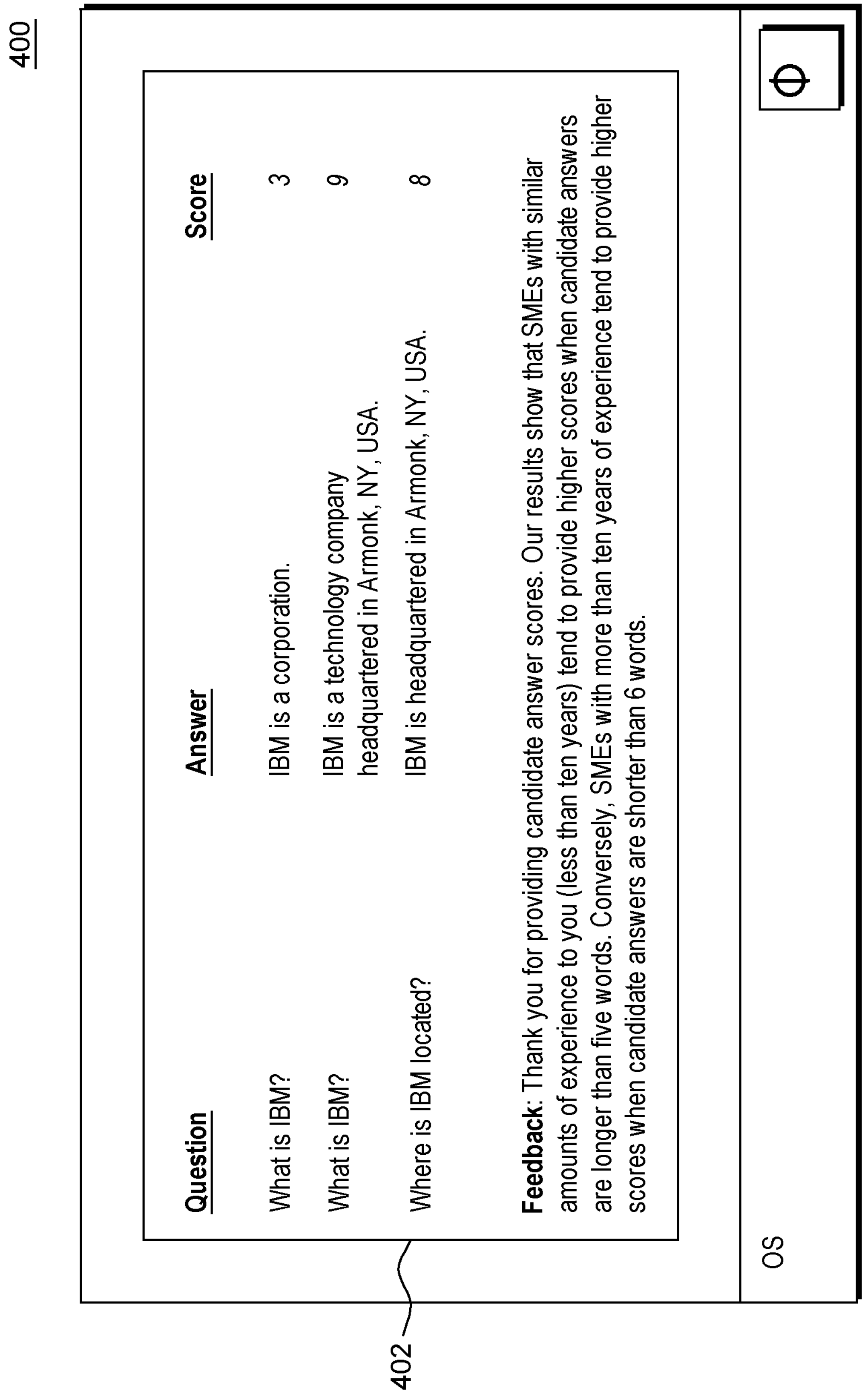

| ANSWER | ANSWER SCORE | F1 | F2 | F3 | F4 | F5 | F6 | F7 | Fn |
|---|---|---|---|---|---|---|---|---|---|
| The ocean in blue because the sky is blue | 4 | 0.1 | 1.0 | 0.3 | 0.1 | 0.98 | 0.2 | 0.0 | 0.99 |
| The ocean is black during the night | 4 | 0.1 | 1.0 | 0.3 | 0.1 | 0.97 | 0.1 | 0.0 | 0.98 |
| In the rainforest the bay and ocean are green | 4 | 0.1 | 0.8 | 0.2 | 0.1 | 0.75 | 0.2 | 0.01 | 0.96 |
| The ocean is blue | 3 | 0.1 | 0.75 | 0.2 | 0.1 | 0.8 | 0.2 | 0.01 | 0.96 |
| The ocean is full of pollution | 1 | 0.0 | 0.8 | 0.1 | 0.05 | 0.1 | 0.15 | 0.04 | 0.3 |
| The ocean is dirty | 1 | 0.0 | 0.8 | 0.1 | 0.05 | 0.1 | 0.15 | 0.04 | 0.3 |
| The ocean is full of bright blue fish | 1 | 0.1 | 0.9 | 0.1 | 0 | 0.4 | 0.1 | 0.2 | 0.2 |
| Scrooge jumped into an ocean of money | 1 | 0.0 | 0.6 | 0.1 | 0.05 | 0.1 | 0.15 | 0.04 | 0.3 |

| ANSWER | ANSWER SCORE | F1 | F2 | F3 | F4 | F5 | F6 | F7 | Fn |
|---|---|---|---|---|---|---|---|---|---|
| The ocean is blue because the sky is blue | SME 1: 4 | 0.3 | 1.0 | 0.3 | 0.1 | 0.98 | 0.2 | 0.8 | 0.99 |
| The ocean is black during the night | SME 1: 4 | 0.1 | 1.0 | 0.3 | 0.4 | 0.75 | 0.1 | 0.3 | 0.98 |
| The ocean is blue | SME 1:3 | 0.5 | 0.75 | 0.2 | 0.1 | 0.8 | 0.2 | 0.01 | 0.96 |
| The ocean is blue because the sky is blue | SME 2: 4 | 0.3 | 1.0 | 0.3 | 0.1 | 0.98 | 0.2 | 0.8 | 0.99 |
| The ocean is black during the night | SME 2: 3 | 0.1 | 1.0 | 0.3 | 0.4 | 0.75 | 0.1 | 0.3 | 0.98 |
| The ocean is blue | SME 2: 4 | 0.5 | 0.75 | 0.2 | 0.1 | 0.8 | 0.2 | 0.01 | 0.96 |

FIG. 7

CLUSTERING SUBJECT MATTER EXPERTS BASED ON QUESTION AND ANSWER RATINGS

BACKGROUND

The present invention relates generally to the field of question answering systems, and more particularly to clustering subject matter experts based on the ratings they provide for question and answer pairs in question answering systems.

Question answering (QA) is a known computer science discipline within the fields of information retrieval and natural language processing (NLP). Generally speaking, QA systems automatically answer questions posed by humans in natural language, typically by either querying a structured database of knowledge/information or by retrieving answers from unstructured collections of natural language documents. QA systems are commonly designed to answer questions about a specific set of topics (also referred to as a "domain").

One known technique for implementing a QA system is machine learning. Machine learning generally refers to the ability of a computer to learn without being explicitly programmed to do so. Machine learning systems, particularly those that are trained using supervised learning methods, are predicated on a ground truth—that is, a set of training data that is intended to represent objective data by which a machine learning system can base its decisions. In the context of QA systems, a ground truth generally takes the form of questions and their corresponding answers (in other words, question and answer pairs).

To obtain ground truth question and answer pairs, QA systems rely on subject matter experts (also referred to as "annotators") to either provide answers (also referred to as "annotations") to questions or to provide feedback (or "ratings") on existing answers. Inter-annotator agreement is a measure of how well two (or more) annotators can make the same annotation decision for a given domain.

SUMMARY

According to an aspect of the present invention, there is a method, computer program product and/or system that performs the following operations (not necessarily in the following order): (i) receiving descriptive information associated with a domain expert; (ii) receiving a question and a corresponding candidate answer for the question, wherein the candidate answer is generated by a question answering system in response to receiving the question as input; (iii) determining a set of scoring features to be used to evaluate the candidate answer, wherein the set of scoring features includes: at least one scoring feature pertaining to the question, at least one scoring feature pertaining to the candidate answer, and at least one scoring feature pertaining to the descriptive information; (iv) receiving a score from the domain expert, wherein the score is based, at least in part, on the domain expert's evaluation of the candidate answer; (v) generating a feature vector based on the set of scoring features; (vi) cross-correlating the feature vector with the score, resulting in a cross-correlation indicating how the domain expert weighed each of the scoring features; and (vii) clustering the domain expert with one or more other domain experts according to the cross-correlation, thereby creating a first cluster.

BRIEF DESCRIPTION OF THE DRAWINGS

FIG. 4 is a screenshot view generated by the first embodiment system;

FIG. 6 is a diagram showing example scoring data from a subject matter expert (SME), in an embodiment of the present invention;

FIG. 7 is a diagram showing example scoring data from multiple SMEs, in an embodiment of the present invention.

DETAILED DESCRIPTION

Figure 1:
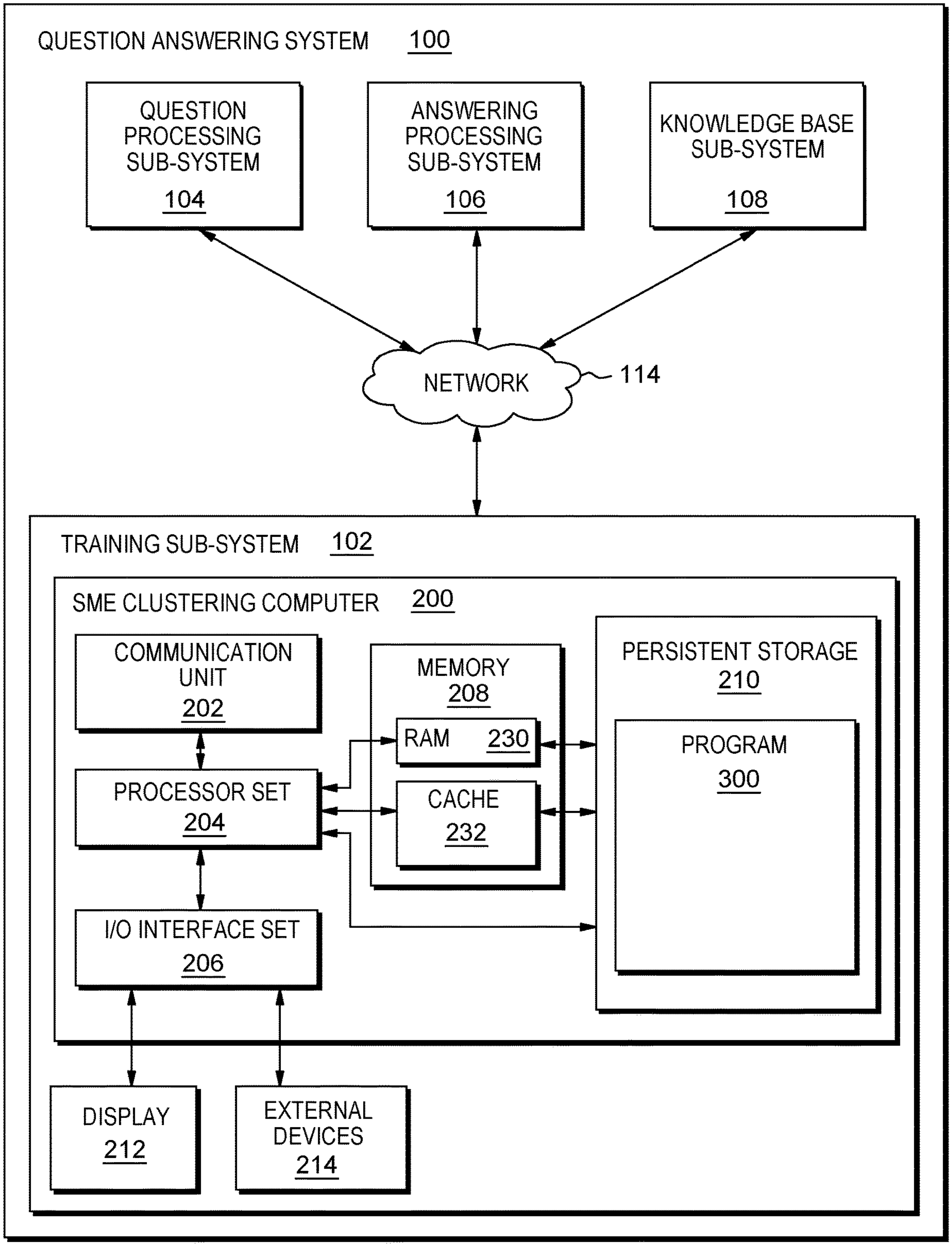
FIG. 1 is a block diagram view of a first embodiment of a system according to the present invention.

When training a machine learning-based question answering (QA) system, multiple subject matter experts ("SMEs," also referred to as "domain experts" or "annotators") may be relied upon to provide ratings for candidate answers to questions. The quality of a QA system's underlying ground truth is ultimately dependent on the quality of these SME ratings. Despite this importance on providing accurate ratings, existing training modules of QA systems do not typically provide SMEs with feedback on how well they are rating candidate answers in relation to each other or in relation to how the QA system itself rates candidate answers. Embodiments of the present invention cross-correlate SME ratings of candidate answers with information pertaining to questions, candidate answers, and the SMEs themselves in order to cluster SMEs into groups. In doing so, as will be discussed in further detail below, embodiments of the present invention provide valuable feedback to SMEs in order to improve the accuracy of their future candidate answer ratings, in addition to providing other benefits. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of question answering (QA) system 100, including: training sub-system 102; question processing sub-system 104; answer processing sub-system 106; knowledge base sub-system 108; communication network 114; subject matter expert (SME) clustering computer 200; communications unit 202; processor set 204; input/output (I/O) interface set 206; memory device 208; persistent storage device 210; display device 212; external device set 214; random access memory (RAM) devices 230; cache memory device 232; and program 300.

Generally speaking, QA system 100 provides natural language answers to natural language questions received as input. Knowledge base sub-system 108 stores documents that serve as at least a part of a corpus of content from which answers to questions are derived. The documents may include any file, text, article, or source of data for use in QA system 100. Question processing sub-system 104 receives the natural language questions to be answered by QA system 100. The questions may be provided by the training sub-system 102 to facilitate training of QA system 100, or may be provided by users of QA system 100. Answer processing sub-system 106 analyzes and compares the language of the questions and determines candidate answers to those questions using the documents in knowledge base 109. Answer processing sub-system 106 also performs evidence scoring (or "relevance scoring") to evaluate the likelihood that a particular candidate answer is a correct answer for an input question. Training sub-system 102 facilitates configuration of QA system 100 to provide answers to submitted questions and to improve the quality of the answers provided to submitted questions. Training sub-system 102 improves the quality of answers provided by QA system 100 by analyzing a ground truth input by subject matter experts and providing feedback that allows the subject matter experts to improve the ground truth provided to train QA system 100.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with SME clustering computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
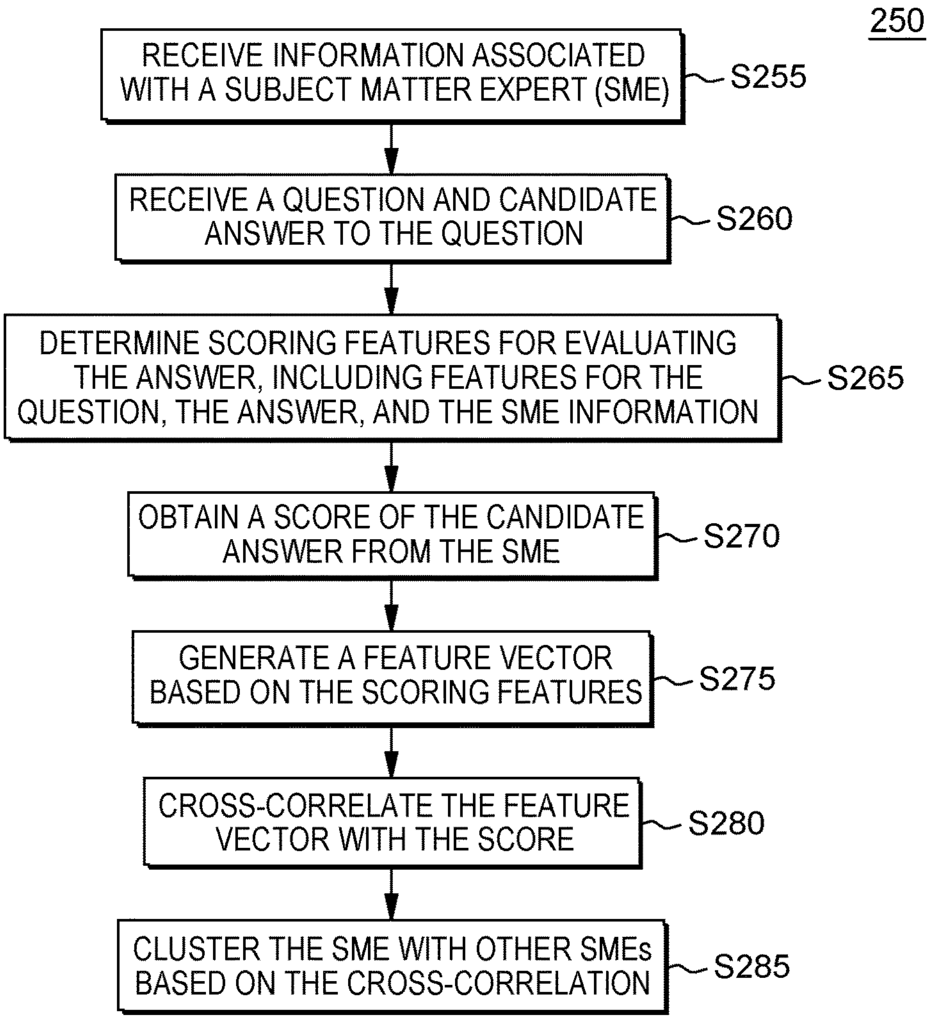
FIG. 2 is a flowchart showing a first embodiment method performed, at least in part, by the first embodiment system.
Figure 3:
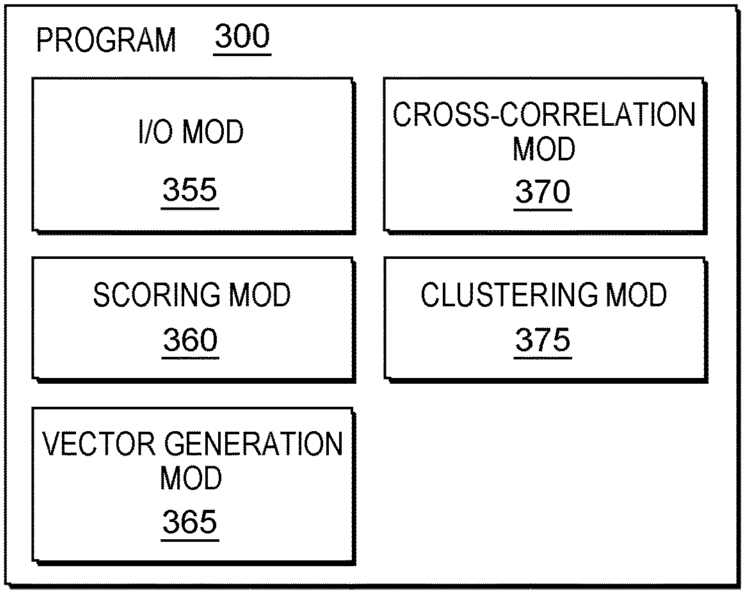
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

In this example embodiment (also referred to in this sub-section as the "present embodiment," the "present example," the "present example embodiment," and the like), question answering (QA) system 100 is a general purpose QA system being trained on a particular domain: International Business Machines (IBM) Corporation of Armonk, N.Y., USA. Program 300—and, more broadly, subject matter expert (SME) computer 200—receives candidate answers to questions about IBM and obtains scores of those candidate answers from SMEs. Upon obtaining scores, program 300 clusters the SMEs based on cross-correlations between their respective scores and information pertaining to the questions, the candidate answers, and the SMEs themselves. It should be noted that this example embodiment is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section.

Processing begins at operation S255, where I/O module ("mod") 355 receives information associated with an SME (that is, a user who has been assigned by training sub-system 102 to provide ratings for candidate answers). The information (also referred to as "descriptive information") may include any information that may be known about the SME. For example, in some embodiments, the information includes biographical information such as name, birthdate, gender, and location of the SME. In other embodiments, the information includes historical information such as places the SME has been and/or events the SME has experienced. In other embodiments, the information includes information known by the SME, such as books, articles, and other sources of information known to have been accessed by the SME. In still other embodiments, the information includes qualification information relating to the SME's status as an SME, such as academic degrees, work experience, and the like.

In the present example, which will be referred to throughout this sub-section, the SME is a user named Thomas, and the received information about Thomas is that Thomas has been considered an SME in the domain of "IBM" for four years.

Processing proceeds to operation S260, where I/O mod 355 receives a question and a candidate answer for the question. The candidate answer is generated by QA system 100 (particularly, answer processing sub-system 106) in response to receiving the question as input. The question and candidate answer may generally include any possible question and answer pair capable of being processed by QA system 100. In the present example (with a domain of "IBM"), the received question is "What is IBM?," and the corresponding candidate answer, generated by answer processing sub-system 106, is "IBM is a corporation."

Processing proceeds to operation S265, where scoring mod 360 determines a set of scoring features for evaluating the candidate answer. Each of the scoring features of the set evaluates the candidate answer based on particular attributes of the candidate answer that are indicative of the relevance of the candidate answer to the received question. Many known (or yet to be known) scoring features may be provided, including, for example, features based on linguistic and syntactic characteristics (such as presence of certain terms), features based on sentence structure and grammatical constructs, and/or features based on relevance of source documents from knowledge base sub-system 108. Furthermore, the scoring features may be determined using a wide variety of known (or yet to be known) methods, including methods that determine which features to use based on machine logic-based algorithms (for example, algorithms trained to select scoring features based on a determined relevance to the question and answer) and methods that determine features based on manual user selection.

In certain embodiments, the set of scoring features includes: (i) at least one scoring feature pertaining to the question, (ii) at least one scoring feature pertaining to the candidate answer, and (iii) at least one scoring feature pertaining to the descriptive information. For example, the present example includes the following scoring features: (A) number of words in the question; (B) number of words in the answer; and (C) number of years of expertise of the SME.

Processing proceeds to operation S270, where I/O mod 355 obtains a score of the candidate answer from the SME. The score is based, at least in part, on the SME's evaluation of the candidate answer. In many embodiments, operation S270 involves providing the question and the candidate answer to the SME (via a computer connected to network 114, for example), and prompting the SME to provide a score. Many known (or yet to be known) scoring scales may be used. In the present example, I/O mod 355 provides the question and the candidate answer to Thomas, and, in response, Thomas enters a score of "3" out of "10."

Processing proceeds to operation S275, where vector generation mod 365 generates a feature vector based on the set of scoring features. In many embodiments, to generate the feature vector, mod 365 analyzes the candidate answer with respect to the set of scoring features. The contents of the feature vector may include a wide variety of values, with the only requirement being that the set of values for the feature vector must include values that correspond to each of the scoring features determined above with respect to operation S265. For example, in some embodiments, the contents of the feature vector indicate whether each scoring feature was indicative of a high quality answer (based, for example, on an answer quality score or relevance score). Further, although the feature vector of the present example includes values corresponding only to the particular question and candidate answer being evaluated (to be discussed in the following paragraph), in certain embodiments the feature vectors may correspond to an entire set of question and answer pairs that have been evaluated by the SME. In these embodiments, the feature vector may include, for example, the number of times that each of the scoring features was indicative of a high quality answer over the entire set of question and answer pairs evaluated by the SME.

In the present example, the generated feature vector includes values that directly correspond to each of the determined scoring features. The value for scoring feature (A)—number of words in the question—equals one (1) when the number of words in the question is greater than five (5), and equals zero (0) when the number of words in the question is less than or equal to five (5). The value for scoring feature (B)—number of words in the answer—equals one (1) when the number of words in the answer is greater than five (5), and equals zero (0) when the number of words in the answer is less than or equal to five (5). The value for scoring feature (C)—number of years of expertise of the domain expert—equals one (1) when number of years of expertise of the domain expert is less than ten (10), and equals zero (0) when the number of years of expertise of the SME is greater than or equal to ten (10). Therefore, the vector generated for the question and candidate answer of the present example includes the following values: 0 ("What is IBM?" contains five or fewer words), 0 ("IBM is a corporation" contains five or fewer words), and 1 (the SME's years of expertise—four—are less than ten).

Processing proceeds to operation S280, where cross-correlation mod 370 cross-correlates the feature vector with the obtained score from the SME. While several detailed examples of such cross-correlation are discussed below, in the Further Comments and/or Embodiments sub-section of this Detailed Description, the cross-correlation of the present example is rather simple: the value of 0 for scoring feature (A), indicating that the question contains five or fewer words, the value of 0 for scoring feature (B), indicating that the answer contains five or fewer words, and the value of 1 for scoring feature (C), indicating that the SME has fewer than ten years of expertise, are all correlated with a score of 3 out of 10 (that is, a relatively low score).

Processing proceeds to operation S285, where clustering mod 375 clusters the SME with one or more other SMEs according to the cross-correlation, thereby creating a first cluster. Many known (or yet to be known) clustering methods may be used, including, for example, a hierarchical clustering algorithm such as a k-means algorithm. In the present example, the SME is clustered with other SMEs who: (i) have fewer than ten years of experience; (ii) tend to give relatively low scores to questions containing five or fewer words result in relatively low scores; and/or (ii) tend to give relatively low scores to answers containing five or fewer words.

Once the SME has been clustered with one or more other SMEs, training sub-system 102 can utilize the first cluster in a number of helpful ways. For example, in an embodiment, I/O mod 355 provides members of the first cluster, including the SME, with information pertaining to the first cluster as well as the activities of SMEs in other clusters that have been created by clustering mod 375. By providing this feedback to the SME, training sub-system 102 can better inform the SME of the SME's differences with other SMEs, and thereby potentially improve subsequent inter-annotator agreement scores.

Screenshot 400 (see FIG. 4) depicts an example of such feedback being provided to the SME (Thomas) in the present example embodiment. As shown in interface portion 402, the SME is presented with the question and the candidate answer discussed above, as well as the score of the candidate answer previously provided by the SME (see discussion regarding operation S270, above). Interface portion 402 also shows two more question and candidate answer pairs along with their corresponding scores provided by the SME. Based on this information, and the corresponding cross-correlations between the scores and the generated feature vectors, I/O mod 355 provides feedback that includes information about the first cluster and SMEs of other clusters. While the feedback shown in FIG. 4 will not be reproduced in its entirety here, a general theme of the feedback is that it indicates that SMEs with more than ten years of experience tend to provide higher scores when candidate answers are shorter than six words. This feedback, which may indicate that the longer an SME is an "expert," the more they might tend to appreciate shorter answers to questions, can then be used by Thomas to potentially influence his ratings of candidate answers in the future. Similar feedback (not shown) may also be provided to SMEs of other clusters, thereby resulting in a potential convergence of SME clusters over time.

In other embodiments, upon clustering SMEs in operation S285, program 300 may generate respective machine learning models for each cluster. In these embodiments, the respective machine learning models utilize ground truths constructed based, at least in part, on scores from domain experts associated with respective clusters. Program 300 can then utilize these models to provide topic or domain-specific (that is, SME cluster-specific) answers to questions, in situations where such specificity is desired. A further discussion of some of these embodiments is presented below, in the Further Comments and/or Embodiments sub-section of this Detailed Description.

In still other embodiments, upon clustering SMEs in operation S285, program 300 may retrain a machine learning model based on both the first cluster and a second cluster. Again, further discussion of these embodiments is provided below, in the Further Comments and/or Embodiments sub-section of this Detailed Description.

III. Further Comments and/or Embodiments

Some embodiments of the present invention recognize that feedback is required when a group of domain experts rate candidate answers in a question answering (QA) system to build ground truth question and answer pairs. A QA system's ultimate quality can be highly constrained by the quality of the ground truth used to train the QA system. As such, it can be important for a QA system developer/provider to provide assurances to users of the QA system on the credibility of a ground truth.

In many cases, the primary feedback for a set of ground truth question and answer pairs is either a manual inspection (by experts at training cognitive systems) or an evaluation of the cognitive system after its lengthy training phase. Existing solutions yield long feedback cycles and make it difficult for users to quickly get a sense of the quality of the ground truth they are providing to the system.

The training of a QA system may rely on a multi-person generation of ground truth to train the ranking service, where each user is tasked with ranking answers that were retrieved. The features used to build up a ranking service depend on how the users generate the ground truth from the questions and the answers. There is typically no indication to the user or the group of experts on how well they are ranking the answers in relation to each other and in relation to how the ranker performs underneath. Additionally, it can be difficult to tell how many points-of-view are presented in the ground truth where the points-of-view may be internally consistent but not consistent with each other.

Some embodiments of the present invention recognize the following facts, potential problems and/or potential areas for improvement with respect to the current state of the art: (i) existing inter-annotator agreement approaches do not take into consideration question-answer pairs where answers are actually different (for example, when a single question is paired with multiple, different answers); (ii) existing approaches determine agreement between annotators without considering annotations produced automatically via computers; (iii) some existing approaches are limited to only two raters/annotators; and/or (iv) existing clustering solutions do not apply well to SMEs rating answers in question answering systems, as existing solutions (for example, context-aware recommendation systems) are designed for homogenous item sets, while question answering systems inherently involve two disjoint sets: questions and answers.

Some embodiments of the present invention may include one, or more, of the following features, characteristics and/or advantages: (i) evaluating SMEs based on their ranking of candidate answers; (ii) utilizing rating/ranking information instead of simple correct/incorrect labels to evaluate candidate answers/labels; (iii) improving evaluations by recognizing multiple personality traits of SMEs and utilizing those personality traits to attempt to obtain consistency among different SMEs; (iv) uncovering SME traits with the goal of gathering consistent label annotations that can be used to train a statistical model; (v) utilizing a statistical pattern recognition approach to obtain superior results; and/or (vi) providing consistent feedback to SMEs based on their ratings of relevant answers.

Some embodiments of the present invention: (i) cluster subject matter expert (SME) ratings of a ground truth based on important features used in the evaluation; (ii) align feature values with topics for those clusters; and (iii) create machine learning models based on each significant cluster to be utilized for topic or domain specific answers that align well. These embodiments: (i) evaluate the reasoning each SME uses to rate the candidate answers by selecting features of the questions, answers, and SME information; (ii) generate correlations for each SME to the features the system evaluated; and (iii) create clusters of SMEs based on their correlations to the features.

An advantage of the above approaches is that they provide explanation on the reasoning each SME uses to rate candidate answers by generating features from questions, answers, and SME information. In these embodiments, the explanation may be based on the correlation between each SME and the features of the system being evaluated. The explanation may also be derived from clusters of SMEs based on their correlations to the features.

In some embodiments, SMEs are asked to analyze question-answer pairs, and, upon the SMEs providing their analysis, feature vectors are created based on the questions, their candidate answers, and contextual/personal information about the SMEs. In these embodiments, the SME information serves as extra information for the preference context for candidate answers. This is an improvement over traditional QA systems, which tend to focus scoring on candidate answers while rarely comparing feature from the original questions against each other, and which do not consider information about SMEs in their scoring.

Grouping and/or clustering procedures according to embodiments of the present invention can be carried out in both supervised and unsupervised settings. For example, in an unsupervised setting, the SMEs can be clustered and compared against each other based on key characteristics of the questions and answers chosen. In a supervised setting, feature vectors can be cross correlated with the ratings provided by SMEs.

Figure 5:
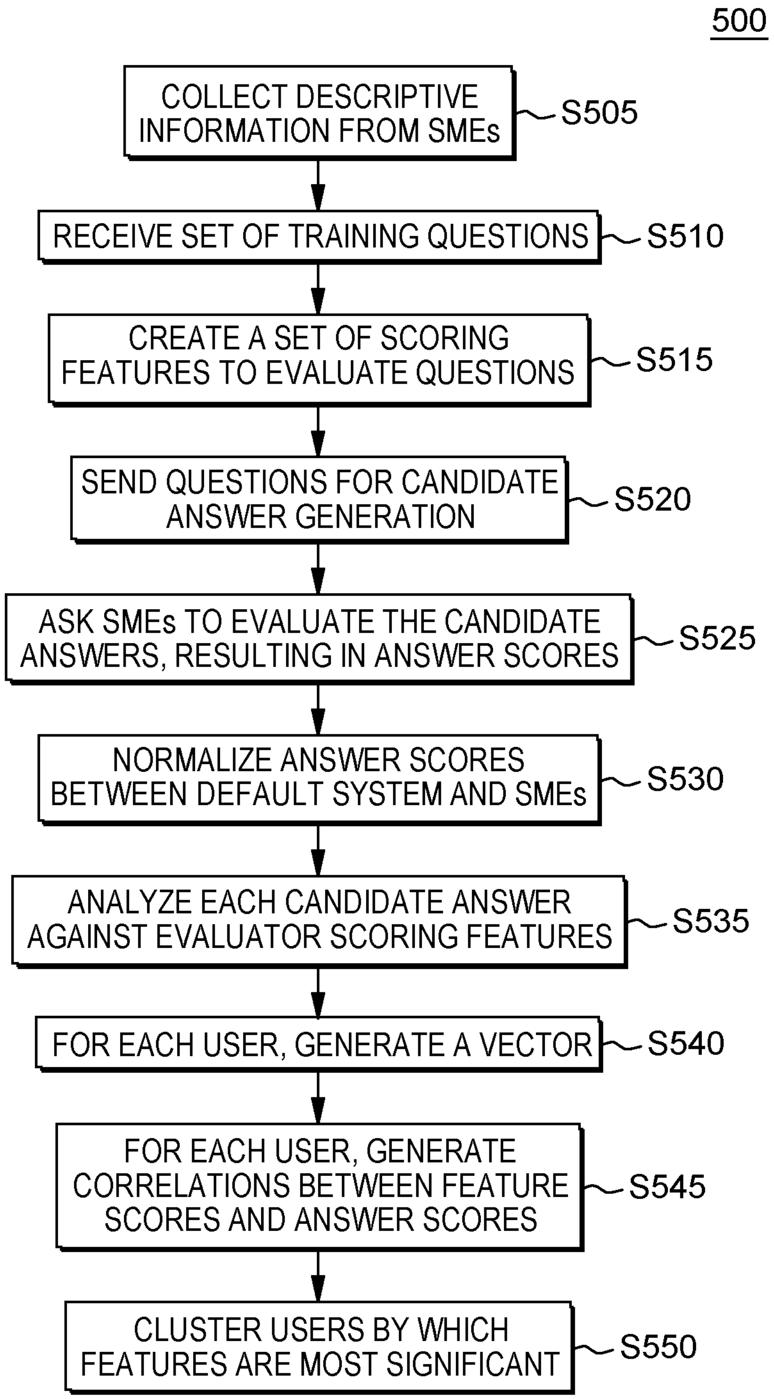
FIG. 5 is a flowchart showing a second embodiment method performed according to an embodiment of the present invention.

FIG. 5 shows flowchart 500 depicting a method according to the present invention. Processing begins at operation S505, where a question answering (QA) system (not shown) collects descriptive information from a set of SMEs. In this embodiment, the descriptive information includes the age and gender of each respective SME of the set of SMEs.

Processing proceeds to operation S510, where the QA system receives a set of training questions. As will be discussed in further detail below, the training questions will be used in generating ground truth questions and answers for the QA system.

Processing proceeds to operation S515, where the QA system creates a set of scoring features to evaluate questions. In this embodiment, the scoring features include features that are relevant to a trivia-type information retrieval system: (i) question category, and (ii) question type. For example, the question category may include trivia-type categories such as “Countries,” “Revolutionary War,” “Geology,” “Food” and “Music.” The question type may be related to Lexical Answer Type, which is often a named entity like a person, location, or time. For example, for the category “Revolutionary War,” and the question “Who was the Best Commander in the Colonial army?”, “Revolutionary War” is the category and the question type is “Who”.

Processing proceeds to operation S520, where the QA system sends the questions for candidate answer generation. In this embodiment, the questions are sent to a “default” QA module of the QA system. The QA module then generates candidate answers to the questions, based on its training to-date. Each answer generated by the QA module includes a corresponding passage from a corpus and a corresponding relevance score of the passage. In this embodiment, the relevance score is between zero and one. (which, in this embodiment, is between zero and one).

Processing proceeds to operation S525, where the QA system asks the SMEs of the set of SMEs to evaluate each of the candidate answers, resulting in answer scores for each SME/answer pair. In this embodiment, each answer score for an SME is a whole number between one and four (with one being the worst and four being the best).

Processing proceeds to operation S530, where the QA system normalizes values between the relevance scores generated by the QA module and the answer scores provided by the SMEs.

Processing proceeds to operation S535, where the QA system analyzes each candidate answer against the scoring features. In addition to the scoring features mentioned above in relation to operation S515 (question type and question category, which pertain to the received questions), in this step, the QA system may also utilize scoring features pertaining to the descriptive information and/or the candidate answers. Some example of scoring features for the descriptive information include features based on the SME’s respective age and/or gender. Further, some examples of scoring features for candidate answers include: (i) negation service; (ii) focus properties; (iii) sentence parse relationships, modifiers, and/or grammatical constructs; (iv) Lucene/Solr index feature, and/or (v) heuristic-based ranking algorithms used in information retrieval system searches. Negation service, as described herein, is a deployed software application/service that identifies spans of question that are the object of a negation, and also identifies the question that triggered the negation. For example, in the field of medicine, the following text is provided: “Patient will not start on cisplatin 80 mg on Jan. 1, 2018. Patient is also diabetic.” In this example, a negation is triggered by the word “not” and covers the text “start on cisplatin 80 mg”. Focus properties, as described herein, relate to the “focus” of a question—that is, the part of the question that is a reference to the answer. The focus of a question is used, for example, by algorithms that attempt to align the question with a potential supporting passage. For proper alignment, the answer in the passage should align with the focus in the question. For example, “He” is the focus in the following trivia clue/question: “POETS & POETRY: He was a bank clerk in the Yukon before he published Songs of a Sourdough in 1907.”

FIGS. 6 and 7 are diagram views depicting candidate answers, answer scores, and scoring feature according to the embodiment depicted in FIG. 5. It should be noted that the data depicted in FIGS. 6 and 7 is provided for example purposes, and as such some of the data has been reduced for brevity.

Diagram 600 (see FIG. 6) shows example data from one SME. In diagram 600, scoring features F1 through Fn come from a variety of sources, including information about the SME, information about the question, and information about the answer. Diagram 700 (see FIG. 7) shows similar example data, but for multiple SMEs. In diagram 700, the same scoring features F1 through Fn are provided for both SME 1 (the SME from FIG. 6) and SME 2 (another SME). It should be noted that other embodiments may include scoring features for even more SMEs. For example, in some embodiments, groups of five or six SMEs are used, where the five or six SMEs are selected based on their agreement on a small set of question-answer pairs but overall disagreement on most question-answer pairs.

Referring back to FIG. 5, processing proceeds to operation S540, where the QA system generates at least one vector for each user, where each vector includes the number of times each feature was predictive of a high quality answer. This may be done by looking at high-value columns in rows of relevance scores (generated by the default QA module) and/or answer scores (provided by SMEs). In the example depicted in FIG. 7, vectors are generated using the scoring features in each row, where each row corresponds to a vector comprising the set of values depicted for each feature in that respective row.

Figure 8:
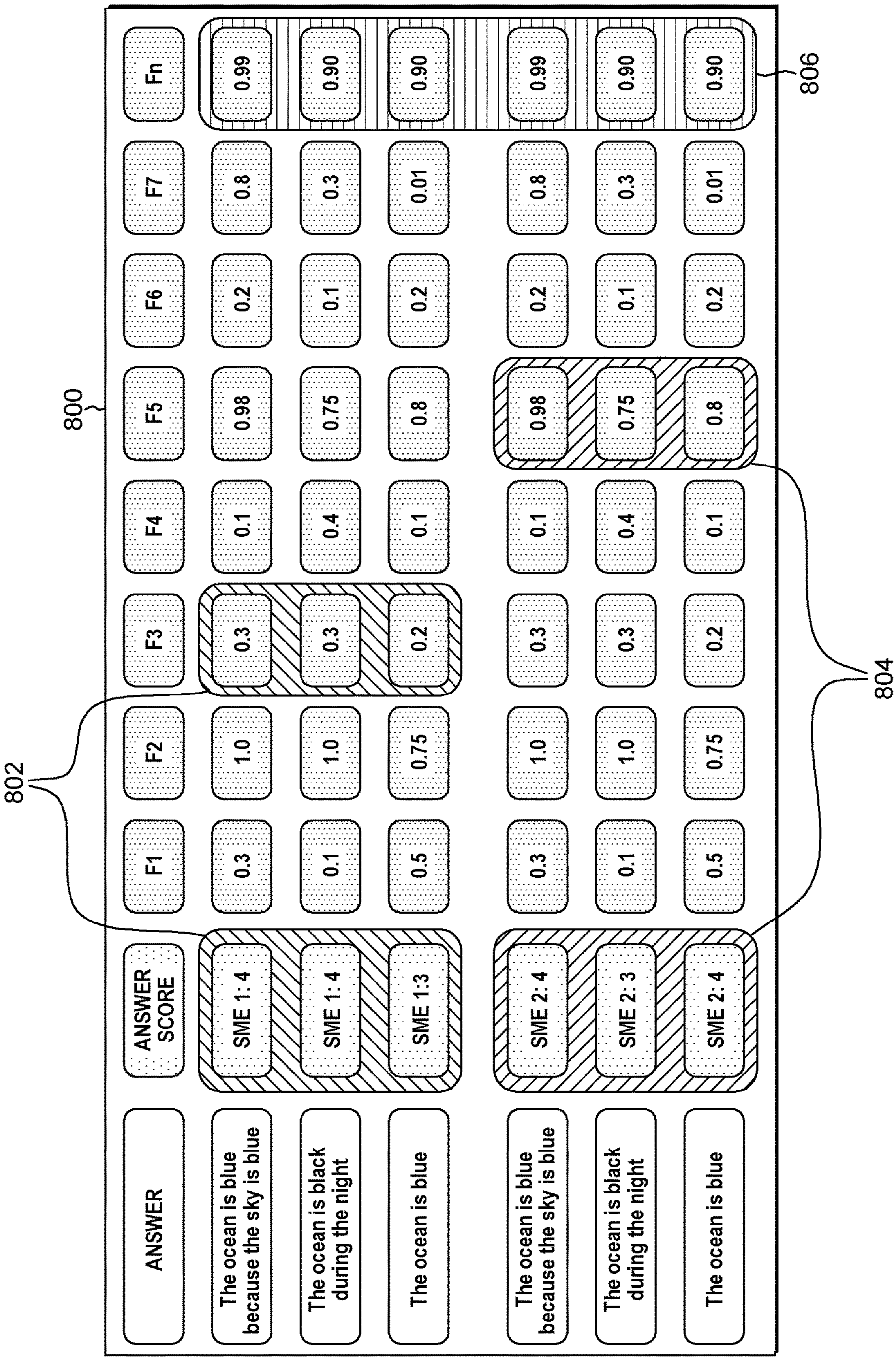
FIG. 8 is a diagram depicting correlations between feature scores and respective answer scores, in an embodiment of the present invention.

Processing proceeds to operation S545, where the QA system generates correlations between feature scores and their respective answer scores, to determine which features are most significant to each user. FIG. 8 is a diagram depicting an example of such correlations. Diagram 800 shows the example data from diagram 700 (see FIG. 7), but with correlations indicated. As shown, SME 1's answer scores correlate strongly with the feature scores for Feature 3 (see reference indicator 802), and SME 2's answer scores correlate strongly with the feature scores for FIG. 5 (see reference indicator 804). It should be noted, however, that the correlations shown in FIG. 8 are provided for example purposes, and that, generally speaking, the correlations generated in operation S545 can be any type of correlation between any scoring features (shown or not shown) and their respective answer scores.

Processing proceeds to operation S550, where the QA system clusters SMEs based on which features are most significant to them. In this embodiment, a hierarchical clustering algorithm (such as a k-means algorithm) is used to perform the clustering. Referring again to FIG. 8, the correlations depicted in diagram 800 indicate that: (i) SME 1 could be clustered based on SME 1's strong correlation to Feature 3 (see reference indicator 802), clustering SME 1 with other SMEs who correlate strongly with Feature 3, and (ii) SME 2 could be clustered based on SME 2's strong correlation to Feature 5 (see reference indicator 804), clustering SME 2 with other SMEs who correlate strongly with Feature 5.

Referring still to FIG. 8, it should also be noted that the method associated with flowchart 500 (see FIG. 5) provides for situations where two SMEs can be clustered separately (that is, placed in different clusters), even though they may have matching scores for corresponding features (see reference indicator 806). This characteristic represents an improvement over existing methods for inter annotator agreement, as it allows for SMEs to be clustered in ways that are more nuanced than simply matching respective SME's feature scores.

As discussed above in the Example Embodiment subsection of this Detailed Description, once the SMEs have been clustered, several actions can be performed based on the clustering. In certain embodiments, the QA system generates multiple models based on clusters of SMEs that are close to each other. In these embodiments, the ground truth question and answer pairs can be re-segmented based on alignment of feature types as they match a domain or topic, for better relevance and accuracy of answers. For example, the SMEs' ratings can be clustered into several major rating sets, and each of the major rating sets can be used to train a ranking model, resulting in multiple final ranking models. The final rating can be obtained by combining the rating from multiple models (using, for example, a Borda count election method).

In some embodiments, a single learning model for the QA system can also be retrained based on each individual cluster. In these embodiments, the SME clusters are sorted using a ranking distance such as a Kandall tau rank distance. The existing model is then incrementally adapted to each of the clusters based on their respective rankings, based, for example, on model adaptation principles.

Further, in certain embodiments, the QA system provides examples of results from one cluster to members of other clusters, in order to help clusters converge.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User: includes, but is not necessarily limited to, the following: (i) a single individual human; (ii) an artificial intelligence entity with sufficient intelligence to act as a user; and/or (iii) a group of related users.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
receiving descriptive information associated with a domain expert;
receiving a question and a corresponding set of candidate answers for the question, wherein the candidate answers are generated by a question answering system in response to receiving the question as input;
determining a set of scoring features for the candidate answers, wherein the set of scoring features includes a scoring feature pertaining to the descriptive information;
receiving a set of scores from the domain expert, wherein the set of scores corresponds to respective candidate answers of the set of candidate answers;
clustering the domain expert with one or more other domain experts according to those scoring features to which the set of scores of the domain expert most strongly correlate, thereby creating a first cluster;
training a first machine learning model utilizing the first cluster, wherein the first machine learning model utilizes ground truths constructed based, at least in part, on scores from domain experts of the first cluster; and
utilizing the first machine learning model to provide a domain-specific answer to an additional question received by the question answering system, wherein the domain-specific answer is based, at least in part, on the scores from the domain experts of the first cluster.

2. The computer-implemented method of claim 1, further comprising:
clustering additional domain experts, thereby creating a second cluster.

3. The computer-implemented method of claim 2, further comprising:
training a second machine learning model utilizing the second cluster, wherein the second machine learning model utilizes ground truths constructed based, at least in part, on scores from domain experts associated with the second cluster.

4. The computer-implemented method of claim 2, further comprising:
providing members of the first cluster, including the domain expert, with example scores from domain experts in the second cluster.

5. The computer-implemented method of claim 1, further comprising:
retraining the first machine learning model based on both the first cluster and the second cluster.

6. The computer-implemented method of claim 5, wherein retraining the first machine learning model based on both the first cluster and the second cluster comprises:
ranking the first cluster and the second cluster utilizing a ranking distance measure; and
incrementally adapting the first machine learning model to each of the first cluster and the second cluster based on the respective rankings of the first cluster and the second cluster.

7. The computer-implemented method of claim 1, wherein the scoring feature pertaining to the descriptive information includes a number of years of expertise of the domain expert.

8. The computer-implemented method of claim 1, wherein the set of scoring features further includes a scoring feature pertaining to the number of words in the question.

9. The computer-implemented method of claim 1, wherein the set of scoring features further includes a scoring feature pertaining to the number of words in the respective candidate answer.

10. The computer-implemented method of claim 1, wherein the descriptive information associated with the domain expert includes information known by the domain expert, including information from one or more sources of information known to have been accessed by the domain expert.

11. A computer program product comprising a computer readable storage medium having stored thereon:
program instructions to receive descriptive information associated with a domain expert;
program instructions to receive a question and a corresponding set of candidate answers for the question, wherein the candidate answers are generated by a question answering system in response to receiving the question as input;
program instructions to determine a set of scoring features for the candidate answers, wherein the set of scoring features includes at least one scoring feature pertaining to the descriptive information;
program instructions to receive a set of scores from the domain expert, wherein the set of scores corresponds to respective candidate answers of the set of candidate answers;
program instructions to cluster the domain expert with one or more other domain experts according to those scoring features to which the set of scores of the domain expert most strongly correlate, thereby creating a first cluster;
program instructions to train a first machine learning model utilizing the first cluster, wherein the first machine learning model utilizes ground truths constructed based, at least in part, on scores from domain experts of the first cluster; and
program instructions to utilize the first machine learning model to provide a domain-specific answer to an additional question received by the question answering system, wherein the domain-specific answer is based, at least in part, on scores from the domain experts of the first cluster.

12. The computer program product of claim 11, wherein the computer readable storage medium has further stored thereon:
program instructions to cluster additional domain experts, thereby creating a second cluster.

13. The computer program product of claim 12, the computer readable storage medium has further stored thereon:
program instructions to train a second machine learning model utilizing the second cluster, wherein the second machine learning model utilizes ground truths constructed based, at least in part, on scores from domain experts associated with the second cluster.

14. The computer program product of claim 12, wherein the computer readable storage medium has further stored thereon:
program instructions to retrain the first machine learning model based on both the first cluster and the second cluster.

15. The computer program product of claim 12, wherein the computer readable storage medium has further stored thereon:

program instructions to provide members of the first cluster, including the domain expert, with example scores from domain experts in the second cluster.

16. A computer system comprising:

a processor(s) set; and a computer readable storage medium;

wherein:

the processor set is structured, located, connected and/or programmed to run program instructions stored on the computer readable storage medium; and the stored program instructions include:

program instructions to receive descriptive information associated with a domain expert;

program instructions to receive a question and a corresponding set of candidate answers for the question, wherein the candidate answers are generated by a question answering system in response to receiving the question as input;

program instructions to determine a set of scoring features for the candidate answers, wherein the set of scoring features includes at least one scoring feature pertaining to the descriptive information;

program instructions to receive a set of scores from the domain expert, wherein the set of scores corresponds to respective candidate answers of the set of candidate answers;

program instructions to cluster the domain expert with one or more other domain experts according to those scoring features to which the set of scores of the domain expert most strongly correlate, thereby creating a first cluster;

program instructions to train a first machine learning model utilizing the first cluster, wherein the first machine learning model utilizes ground truths constructed based, at least in part, on scores from domain experts of the first cluster; and program instructions to utilize the first machine learning model to provide a domain-specific answer to an additional question received by the question answering system, wherein the domain-specific answer is based, at least in part, on the scores from the domain experts of the first cluster.

17. The computer system of claim 16, wherein the stored program instructions further include:

program instructions to cluster additional domain experts, thereby creating a second cluster.

18. The computer system of claim 17, wherein the stored program instructions further include:

program instructions to train a second machine learning model utilizing the second cluster, wherein the second machine learning model utilizes ground truths constructed based, at least in part, on scores from domain experts associated with the second cluster.

19. The computer system of claim 17, wherein the stored program instructions further include program instructions to retrain the first machine learning model based on both the first cluster and the second cluster.

20. The computer system of claim 17, wherein the stored program instructions further include:

program instructions to provide members of the first cluster, including the domain expert, with example scores from domain experts in the second cluster.

* * * * *